(No Model.) 2 Sheets—Sheet 1.

W. H. CARBERRY.
SEWER TRAP.

No. 464,240. Patented Dec. 1, 1891.

WITNESSES.
J. M. Dolan
W. H. Whitney

INVENTOR.
Wm. H. Carberry
by his Attys
Clarke & Raymond (No Model.) 2 Sheets—Sheet 2.
W. H. CARBERRY.
SEWER TRAP.
No. 464,240. Patented Dec. 1, 1891.
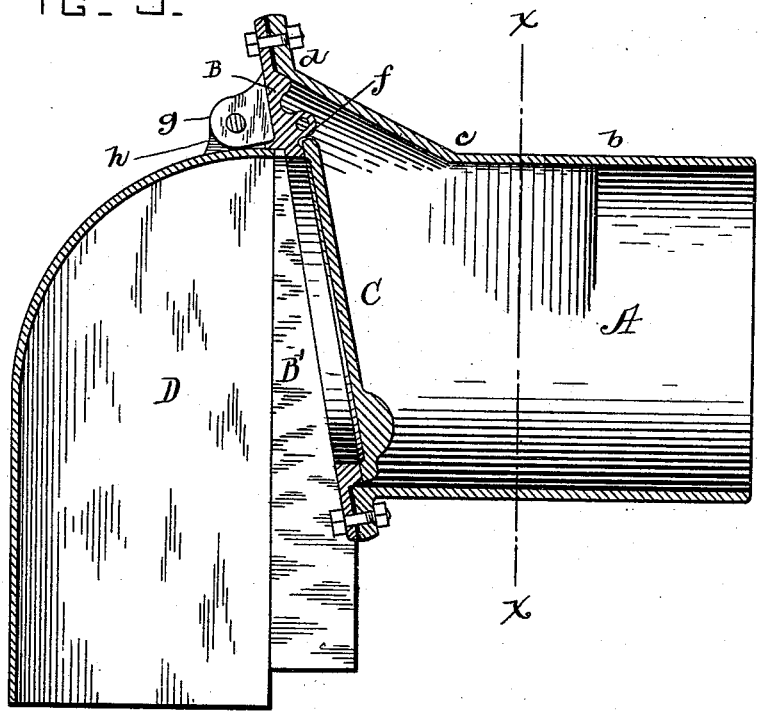
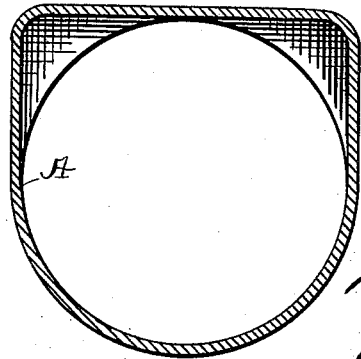
WITNESSES.
J. M. Dolan
W. H. Whitney
INVENTOR.
Wm. H. Carberry
by his Atty
Clarke Raymond

# UNITED STATES PATENT OFFICE.

WILLIAM H. CARBERRY, OF BOSTON, MASSACHUSETTS.

SEWER-TRAP.

SPECIFICATION forming part of Letters Patent No. 464,240, dated December 1, 1891.

Application filed May 8, 1891. Serial No. 391,999. (No model.)

*To all whom it may concern:*

Be it known that I, WILLIAM H. CARBERRY, a citizen of the United States, residing at Boston, in the county of Suffolk and State of Massachusetts, have invented a new and useful Improvement in Sewer-Traps, of which the following is a full, clear, and exact description, reference being had to the accompanying drawings, forming a part of this specification, in explaining its nature.

This invention is an improvement on the sewer-trap invented by Daniel Higgins and patented January 12, 1886, No. 334,378. In the original patent the body of the trap was of square section and the sewer-pipe entering into it was attached to a neck connected with the trap.

This improvement consists in making the trap principally of a round section enlarged near its connection with the catch-basin into a form which is squarish on top and cylindrical below in order to allow of the swing of the inlet-valve.

It also consists in dividing the trap into four main parts and assembling them in such a way that they can readily be inspected.

To enable others skilled in the art to make and use my invention, I describe it in connection with the accompanying drawings, which illustrate its nature.

Figure 1:
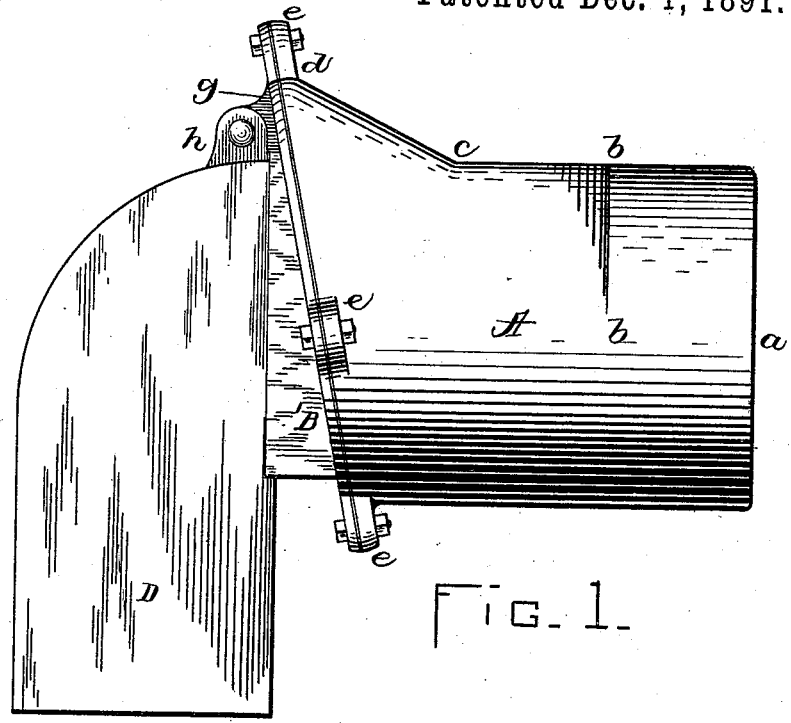
Figure 2:
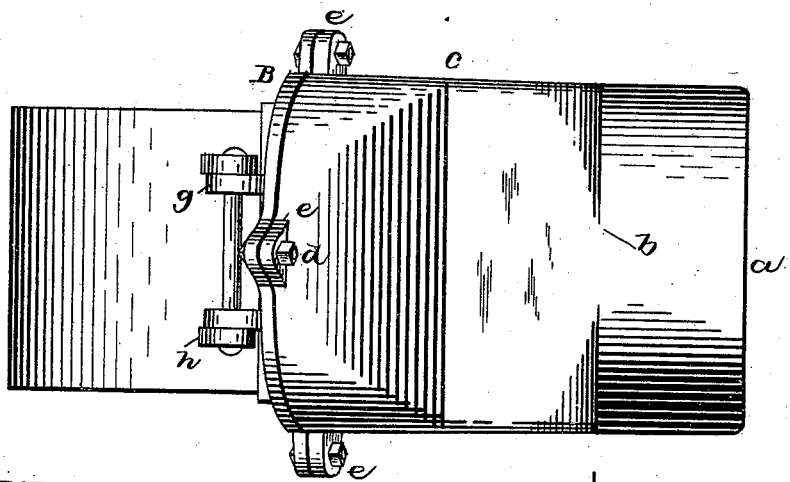

In the drawings, Figure 1 is an elevation of the complete trap. Fig. 2 is a top plan of the same. Fig. 3 is a longitudinal section, and Fig. 4 is a transverse section on the line $x\ x$ of Fig. 3.

Like letters indicate like parts in all of the figures.

A is the body of the trap. At the end $a$ this trap is cylindrical and adapted to couple with an ordinary sewer-pipe. At the point $b$ the upper half of the pipe is square, so as to present an appearance in section much like that shown in Fig. 4. This portion extends of comparatively uniform section from the point $b$ to the point $c$, being about the central third of the length of the body of the trap upon its upper side. From the point $c$ to the point $d$ the upper contour of the body of the trap is slanted and the body becomes in some degree oval.

The front end of the trap is beveled from above downward, as shown in Fig. 1, and there are ears $e$ cast upon this body A for the attachment of a face-plate B. This face-plate B is shaped to fit the contour of the face of the body and is provided with ears, as shown, for its attachment to the ears of the body of the trap by bolts and nuts. The face-plate B is centrally perforated for the passage of sewage and the perforation is surrounded on the valve side by a valve-seat for the valve C, as shown, Fig. 3. On the inside of this faceplate B, as shown in Fig. 3, are ears $f$ for the purpose of hinging to them the flap-valve C. In consequence of the enlargement of the upper part of the body of the trap between $b$ and $c$, and also the somewhat similar enlargement between $c$ and $d$, this flap-valve C may be swung nearly or quite horizontally, and so open the whole extent of the pipe. From the outer surface of the face-plate surrounding the opening for the valve C there is a projecting flange B', as shown in Figs. 1 and 3, which projecting flange may have a substantial vertical wall, which is built into the wall of the catch-basin, so as to stand substantially flush therewith. Other ears $g$ project from the upper part of the front face of the face-plate B, as shown in Figs. 1 and 3, and to these ears $g$ are hinged by other ears $h$ upon the hood D the said hood, which is of nearly rectangular cross-section, as shown in Fig. 2, and which has sides and a front, but no back, so that it can be swung up in the catch-basin and allow the inspection of the entries to the sewer-pipe and any obstruction to the closing of the valve to be readily cleared away. It will be seen that this apparatus is exceedingly simple; that the part embedded in the masonry of a catch-basin—namely, the body A of the trap—is altogether independent and well protected, and that the face-plate and valve attached to it can, if they get out of order, readily be replaced and can be inspected when desired.

It will be noticed that the flange B', Fig. 1, does not extend below the bottom of the body A. In such a case as this the wall of the catch-basin would necessarily extend forward as far as the rear edge of the hood D; but in most instances it would be more convenient to carry this flange B' farther down, and in such case the wall of the catch-basin would coincide with the inner edge of the flange B', and consequently with the lower edge of the face-plate B, as shown in Fig. 3. This is a pretty convenient form of arranging the trap in connection with the catch-basin, because usually the catch-basin is formed with a domed top or contracted as the body of a bottle is contracted toward the neck. Comparing this structure as here shown with the structure shown in the Higgins patent, it will be seen that the body of the trap, instead of being square as in the Higgins patent, which allows a great quantity of air to be held in it and is apt to ice up in winter, is formed at one end as a cylinder and is semi-cylindrical on its lower side throughout its whole length. Upon the upper side it presents three different aspects. At the front end it is inclined from front to rear and is rounded over into a form substantially oval in its transverse section. When this inclined upper section of the body has reached the upper side of the cylindrical portion of the body at the back end, it joins with a section of about equal length, which is horizontal and is carried straight up from the opposite ends of a horizontal diameter of the cylindrical portion, so as to permit the flap-valve C to be swung upward and make a full opening of the body A. This leaves very little room for air in the upper part of the body of the trap and prevents the icing up of the trap in severe weather. It will be seen that this structure is very economical of material. The iron required to make the body is far less in quantity than the iron required to make the square body of the Higgins trap. It is also very convenient to put together or repair, as the front end of the body will be at the edge of the catch-basin and will be conveniently situated for the attachment of the face-plate. The face-plate will carry all the moving parts, and the only thing liable to get much out of order will be the valve, which can be readily repaired or removed by taking off the face-plate. In economy of construction, therefore, and convenience it possesses considerable advantages over the Higgins trap, on which it is an improvement.

I claim as my invention and desire to secure by Letters Patent the sewer-trap made in four parts, namely:

1. The body A, cylindrical in its rear portion, prismo-cylindrical in its center portion, and oval in its front portion, and provided with the ears $e$ for the attachment of the face-plate B, the face-plate B, provided with ears upon its edge for attachment to the body A, and with ears upon its inside for the attachment of the valve C and with ears upon its outside for the attachment of the hood D, and with the flanges B' at the sides of the central opening, the valve C, and hood D, all combined substantially as and for the purposes described.

2. The face-plate B, pierced at the center for the passage of fluids and provided with ears upon its front for the attachment of the hood D and ears upon its back for the attachment of the valve C, and with the flanges B' on either side of the central opening and on the exterior of the face-plate, and with the valve-seat surrounding the central opening on the inside of said face-plate, all substantially as described, and adapted for combination with the body A and hood D, substantially as described.

3. The face-plate B, pierced at the center for the passage of fluids and provided with ears upon its front for the attachment of the hood D and ears upon its back for the attachment of the valve C, and with the flanges B' on either side of the central opening and on the exterior of the face-plate, and with the valve-seat surrounding the central opening on the inside of said face-plate, all substantially as described, and adapted for combination with the body A and valve C, substantially as and for the purpose described.

4. The face-plate B, pierced at the center for the passage of fluids and provided with ears upon its front for the attachment of the hood D and ears upon its back for the attachment of the valve C, and with the flanges B' on either side of the central opening and on the exterior of the face-plate, and with the valve-seat surrounding the central opening on the inside of said face-plate, all substantially as described, and adapted for combination with the body A, the valve C, and the hood D, substantially as described.

5. The body A, cylindrical in its rear portion, prismo-cylindrical in its center portion, and oval in its front portion, and provided with ears $e$ at the front end thereof for the attachment of the face-plate B and adapted to be combined with a face-plate by said ears, substantially as and for the purpose described.

6. The face-plate B, having an opening at its center and attaching-ears at its edge and provided with a valve-seat surrounding its opening and with ears $f$ on the same side, in combination with the valve C, suspended by said ears $f$, substantially as and for the purposes described.

WILLIAM H. CARBERRY.

In presence of—
F. F. RAYMOND, 2d.,
J. M. DOLAN.